United States Patent [19]

Itoh

[11] Patent Number: 4,635,077

[45] Date of Patent: Jan. 6, 1987

[54] INK JET RECORDING HEAD

[75] Inventor: Susumu Itoh, Hiratsuka, Japan

[73] Assignee: Canon Kabushiki Kaisha, Tokyo, Japan

[21] Appl. No.: 702,680

[22] Filed: Feb. 19, 1985

[30] Foreign Application Priority Data

Mar. 1, 1984 [JP] Japan ................................ 59-37303

[51] Int. Cl.[4] ........................................ G01D 15/16

[52] U.S. Cl. ........................................ 346/140 R

[58] Field of Search .............................. 346/140 R

[56] References Cited

U.S. PATENT DOCUMENTS

| | | | |
|---|---|---|---|
| 4,380,771 | 4/1983 | Takatori | 346/140 R |
| 4,437,100 | 3/1984 | Sugitani et al. | 346/1.1 |
| 4,514,741 | 4/1985 | Meyer | 346/140 R |
| 4,521,787 | 6/1985 | Yokota et al. | 346/140 R |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

An ink jet recording head comprises a photosensitive hardened resin film formed on a substrate to form at least portions of an ink path and an ink reservoir and a cover for the ink path and the ink reservoir. The cover has a recess formed in a portion thereof facing the ink reservoir.

10 Claims, 12 Drawing Figures

INK JET RECORDING HEAD

BACKGROUND OF THE INVENTION

1. Field of the Invention

The present invention relates to an ink jet recording head, and more particularly to a recording head for generating ink droplets used in an ink jet recording system in which ink droplets are generated and deposited onto a record medium such as paper to make a record.

2. Description of the Prior Art

An ink jet recording system, in which ink droplets are generated and deposited onto a record medium such as paper to make a record, generates negligible noise when it is operated, allows high speed recording and can make the record on plain paper without special processing such as fixing. Various types of apparatus of this system have been vigorously developed.

A recording head of the ink jet recorder usually has an orifice through which ink is discharged, ink path connected to the orifice and including a portion in which an energy for discharging the ink acts on the ink, an ink reservoir for storing therein the ink to be supplied to the ink path and an ink supply hole through which the ink is supplied to the ink reservoir from externally of the recording head.

The energy for discharging the ink in the recording operation is created by an energy generating device such as a heat generating device or piezoelectric device arranged at a predetermined position in the portion of the ink path which applies the energy to the ink (energy acting portion).

Of the ink jet recording heads of this type, a recording head which can be mass-produced with a high precision is one in which a wall made of a photosensitive resin film which forms the ink path and the ink reservoir is formed on a substrate on which the ink discharge energy generating device is mounted, and a cover for the ink path and the ink reservoir is formed.

FIG. 1 shows major portions of a typical example of such prior art ink jet recording head. It is a perspective view of the prior art ink jet recording head.

Numeral 1 denotes an orifice through which liquid is discharged to form flying droplets, numeral 2 denotes an ink path connected to the orifice 1 and having a portion (not shown) in which a discharging energy generated by a discharging energy generating device 6 mounted on a substrate 5 acts on the ink, numeral 3 denotes an ink reservoir for supplying the ink to the ink path 2, numeral 4 denotes an ink supply hole through which the ink is supplied to the ink reservoir 3 from externally of the head, numeral 5 denotes the substrate on which the discharge energy generating devices 6 are mounted to face the ink paths 2, and numeral 7 denotes a cover.

A so-called full-multi recording head in which a plurality of orifices are arranged at a high density is suitable for high speed recording of a high resolution image. When the ink jet recording head shown in FIG. 1 is constructed as a full-multi recording head for high speed recording, refilling of the ink from externally of the recording head to the inside thereof is insufficient, and stable discharge of the ink and high response to a discharge signal are not attained.

Such shortcomings are considered to be due to the structure of the recording head. Since the ink path 2 and the ink reservoir 3 are formed in union, the depth of the ink reservoir 3 is equal to the depth of the ink path 2. Since the depth of the ink reservoir 3 is determined with the sizes of the ink path 2 and the orifice 1 dominating it, the capacity of the ink reservoir 3 is not sufficient enough to store the ink necessary to rapidly supply the ink to the plurality of ink paths 2.

In order to resolve the above structural problem, the ink path and the ink reservoir may be constructed to have sizes to satisfy their respective functions in order to form the ink reservoir with a sufficient capacity.

FIG. 2 shows a perspective view of a typical example of such a recording head.

In the recording head of FIG. 2, a wall made of photosensitive resin which forms the ink path 2 is formed on a substrate 5, a ceiling or cover 7 is overlayed to form the ink path 2, and the ink reservoir 3 made of ceramic, glass or resin is bonded. Accordingly, the ink path 2 and the ink reservoir 3 are constructed to be large enough to satisfy their respective functions and the shortage of the capacity of the ink reservoir 3 described above is resolved. However, in the recording head of this structure, since the ink reservoir 3 and the ink path 2 are separately formed and the ink reservoir 3 is bonded on the substrate 5 to form recording head, the number of steps increases and the experience of an expert and a long time are required in order to precisely position the ink reservoir 3 and prevent the ink path 2 from being clogged by the bond. Accordingly, it is difficult to mass produce such a recording head.

SUMMARY OF THE INVENTION

It is an object of the present invention to provide an ink jet recording head having a full-multi structure which allows efficient ink refilling.

It is another object of the present invention to provide an nk jet recording head having a structure which allows a compact head.

It is other object of the present invention to provide an ink jet recording head having a substrate and a hardened photosensitive resin film which forms at least portions of an ink path and an ink reservoir and a cover for the ink path and the ink reservoir, arranged on the substrate, with a recess formed in a portion of the cover which forms the ink reservoir.

DETAILED DESCRIPTION OF THE PREFERRED EMBODIMENTS

Figure 3:
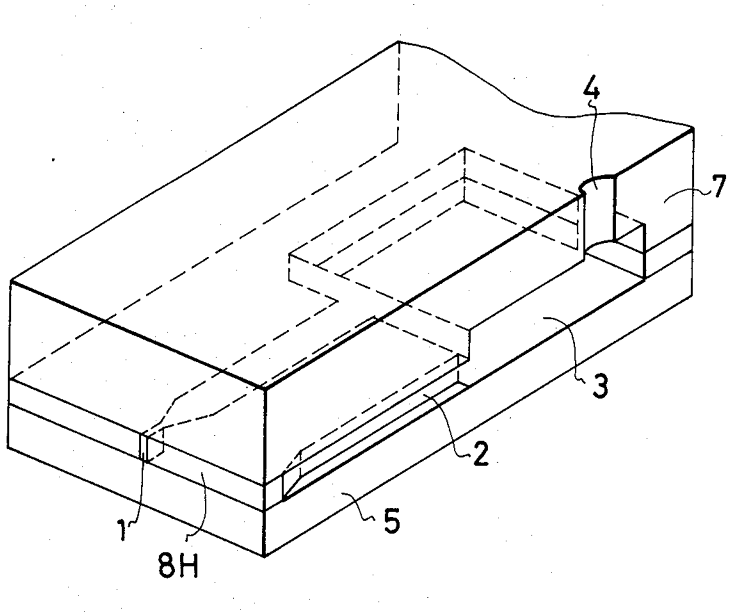
FIG. 3 is an external perspective view, including a sectional view, of ink jet recording head of the present invention.

FIG. 3 is an external perspective view, including a sectional view, of an ink jet recording head of the present invention. Numeral 1 denotes an orifice, numeral 2 denotes an ink path, numeral 3 denotes an ink reservior, numeral 4 denotes an ink supply hole, numeral 5 denotes a substrate and numeral 7 denotes a cover.

Figure 1:
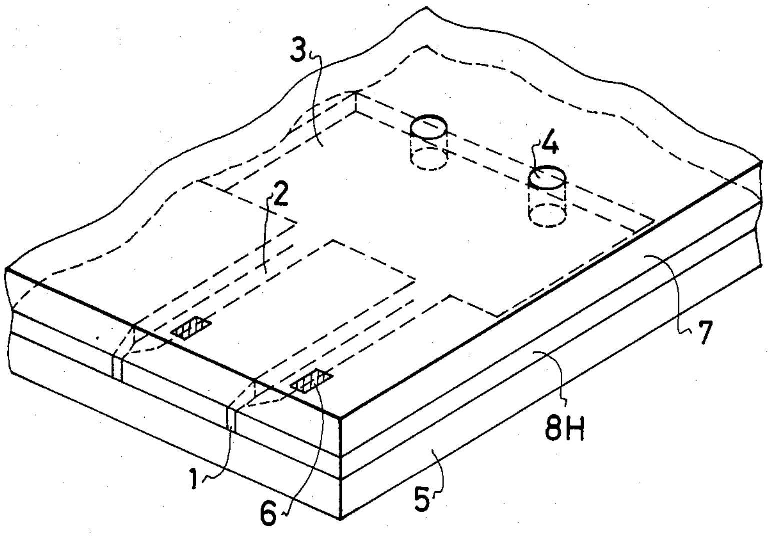
FIGS. 1 and 2 are perspective views of major portions of prior art ink jet recording heads.
Figure 2:
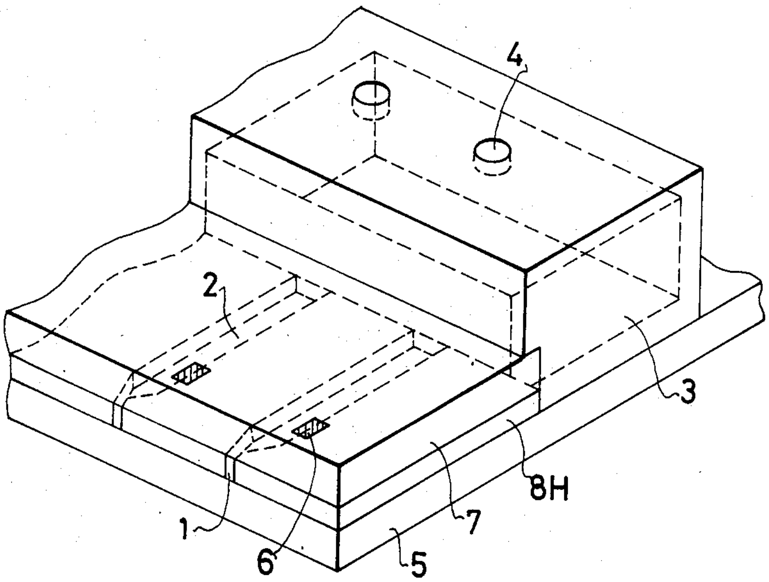

The functions of those elements are identical to those of the prior art recording head shown in FIG. 1, and like numerals in FIGS. 1-3 refer to similar features.

While not shown in FIG. 3, an energy generating element for generating an energy to discharge ink from the orifice 1 to form droplets and electrodes connected to the energy generating element to supply a discharge signal to the energy generating element are arranged on the substrate 5.

In the recording head of the present invention, a recess is formed in the cover 7 of the ink path 2 and the ink reservoir 3, at a ceiling area of the ink reservoir 3 in order to increase a capacity of the ink reservoir 3 so that a sufficient amount of ink to assure a high ink discharge in the ink reservoir 3.

The ink jet recording head of the present invention is formed in the following steps.

FIGS. 4 to 10 show an embodiment for manufacturing the ink jet recording head of the present invention.

Figure 4:
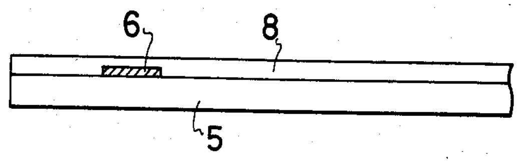
FIGS. 4 to 11 show a method for forming the ink jet recording head of the present invention, and FIG. 12 a sectional view of another embodiment of the ink jet recording head of the present invention.

In order to manufacture the ink jet recording head of the present invention, as shown in FIG. 4, a dry film photoresist 8 (film thickness 25 to 100 $\mu$m) is laminated at a rate of 0.5 to 0.4 f/min under a pressure of 1 to 3 Kg/cm$^3$ on the substrate 5 made of glass, ceramic, resin or metal on which the discharge energy generating element 6 is mounted.

Figure 5:
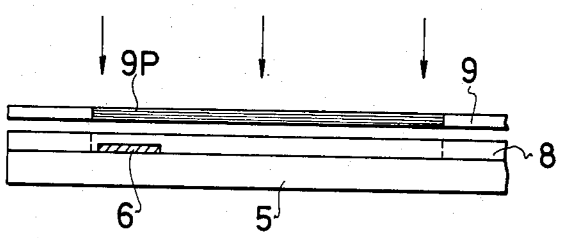

Then, as shown in FIG. 5, a photo-mask 9 having a light non-transmissible pattern 9P in the shape of the orifice 1, ink path 2 and ink reservoir 3 is overlayed on the dry film photoresist 8 on the substrate 5, and a light (arrows in FIG. 5) is exposed to the photo-mask 9. The pattern 9P is designed and the photomask 9 is positioned to the substrate 5 in such a manner that an area of the pattern 9P which corresponds to the ink path covers the area of the discharge energy generating element 6 arranged on the substrate 5 so that the element 6 is mounted in the ink path formed after the exposure and developing processes.

Through this exposure process, the areas other than those covered by the pattern 9P, that is, the area of the photoresist 8 exposed by the light are polymerized and hardened and rendered solvent non-dissolvable while the unexposed areas remain solvent dissolvable.

Figure 6:
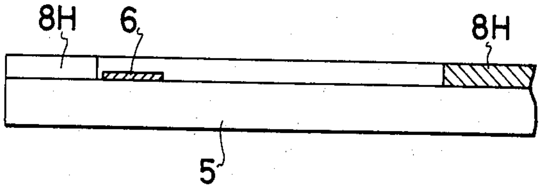

It is then dipped into volatile organic solvent such as trichrole ethane so that the solvent dissolvable unpolymerized (unhardened) areas of the dry film photoresist 8 are dissolved and the hardened areas 8H of the photoresist remain on the substrate 5 as shown in FIG. 6. The hardened photoresist film 8H on the substrate 5 is further hardened to enhance the anti-dissolvability of the film 8H. The photoresist film 8H may be further hardened by heating it at 130° C. to 160° C. for 10 to 60 minutes to thermally polymerize it, or by irradiation with ultraviolet rays. The combination of those is preferable.

Figure 7:
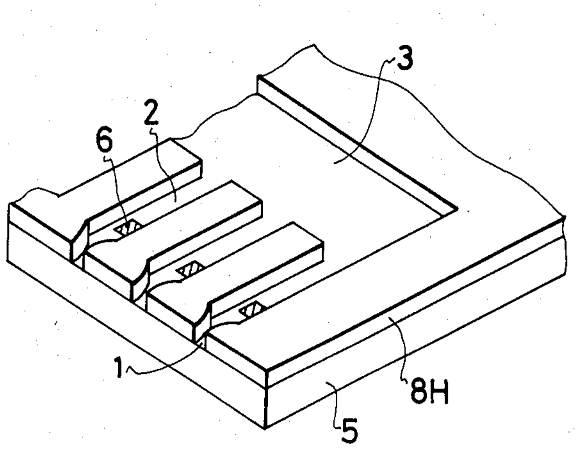

In this manner, the side wall of the ink path 2 and the ink reservoir made of the hardened photoresist film 8H is formed as shown in FIG. 7.

In addition, the cover 7 is formed in the following manner.

Figure 8:
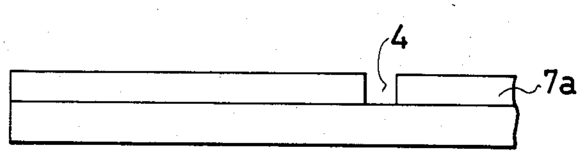

As shown in FIG. 8, a dry film photoresist 10 is formed in a similar manner to that described above on a plate 7*a* made of glass, ceramic, resin or metal and having predetermined shape and size, in which the ink supply hole 4 is formed.

Figure 9:
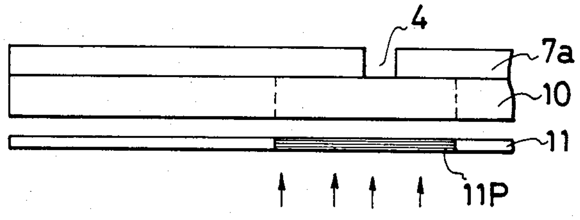

Then, as shown in FIG. 9, a photo-mask 11 having a light non-transmissible pattern 11P having a shape of the ink reservoir 3, is overlayed on the dry film photoresist 10 formed on the plate 7*a*, and a light (arrows in FIG. 9) is exposed to the photo-mask 11. The pattern 11P is shaped and positioned to the plate 7*a* in such a manner that the portion of the pattern 11P facing the ink reservoir covers the plate 7*a* in wich the ink supply hole 4 is formed and the supply hole 4 is formed in the sealing of the ink reservoir which is formed after the exposure and developing steps.

Figure 10:
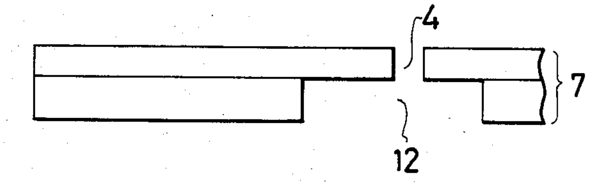
Figure 11:
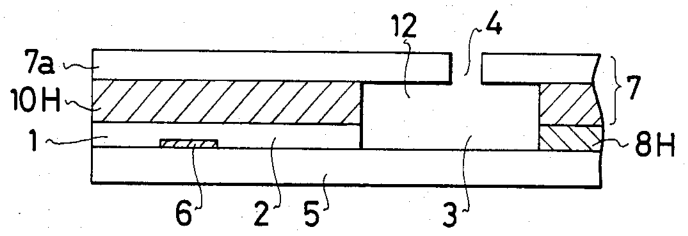

Then, the dry film photoresist film 10 is processed by solvent in the same manner as the sidewall of the ink path formed on the substrate 5, to form the cover 7 having the recess 12 as shown in FIG. 10.

The cover 7 is applied onto the hardened photoresist film 8H formed on the substrate 5 such that the recess 12 of the cover 7 forms a top of the ink reservoir. Then, the hardened photoresist film 10H of the cover 7 is heat treated and/or treated by ultraviolet ray to further enhance the anti-dissolvability of the photoresist film 10H and the bonding force of the bond between the photoresist film 10H and the photoresist film 8H.

Figure 12:
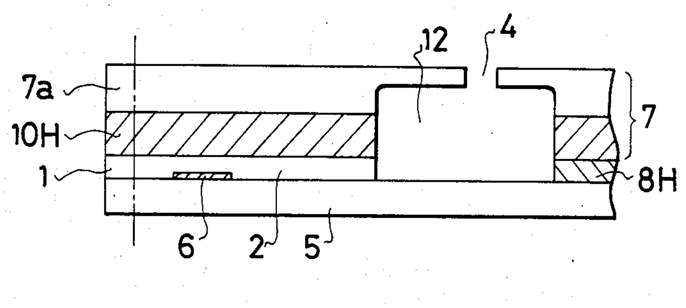

Finally, the assembly is cut along a chain line A-B shown in FIG. 12, and an ink supply tube (not shown) which is to be connected to an ink tank (not shown) externally of the recording head is fitted to the ink supply hole 4 to complete the recording head as shown in FIG. 3.

The purpose of the cutting in the last step is to optimize a distance between the discharge energy generating element 6 and the orifice 1. The distance is appropriately selected in accordance with the design of the recording head.

In the present embodiment, the cover is formed by laminating the photoresist film on the plate and the recess is formed by patterning the photoresist film. Alternatively, it may be formed by etching a predetermined area of the plate by etching solution, and a photoresist film may be formed on the etched plate and it may be patterned to form a cover having a deeper recess as shown in FIG. 12.

Two or more recesses may be formed or they may be grooves. Alternatively, a combination of the recesses and the grooves may be formed.

In the ink jet recording head of the present invention, since the recess is formed in the ceiling of the ink reservoir, the capacity of the ink reservoir is larger than that of the prior art recording head in which the wall of the ink path and the ink reservoir, made of the photosensitive resin film is formed in union on the substrate. Accordingly, the ink jet recording head of the present invention has a sturcture which allows efficient ink refilling when the recording head is constructed in a full-multi structure.

Further, since the wall of the ink path and the ink reservoir of the ink jet recording head of the present invention can be integrally molded by the photosensitive resin, the molding process is simplified as compared with the prior art recording head in which the separately formed ink reservoir is bonded to the substrate. Accordingly, the recording head of the present invention is suitable for mass production with a high precision and also suitable for compact structure.

What is claimed is:

1. An ink jet recording head comprising:

a substrate;

a hardened photosensitive resin film on said substrate for forming at least portions of an ink path and an ink reservoir;

a cover for said ink path and said ink reservoir, said cover having a surface with a recess formed at an area thereof facing said ink reservoir; and an orifice for discharging ink from said ink path, said orifice being defined by said substrate, said resin film and said surface of said cover.

2. An ink jet recording head according to claim 1 wherein said cover comprises a plate and a recess forming member.

3. An ink jet recording head according to claim 2 wherein said recess forming member is a hardened photosensitive resin film.

4. An ink jet recording head according to claim 2 wherein said plate has a further recess formed to face said recess forming member.

5. An ink jet recording head according to claim 2 wherein said plate is made of glass, resin, ceramic or metal.

6. An ink jet recording head according to claim 1 wherein said cover is a single member.

7. An ink jet recording head according to claim 6 wherein said cover is made of glass, resin, ceramic or metal.

8. An ink jet recording head according to claim 1 wherein said recess includes a plurality of recesses.

9. An ink jet recording head according to claim 1 wherein said recess includes a plurality of grooves.

10. An ink jet recording head according to claim 1 wherein said recess includes a combination of recesses and grooves.

* * * * *